(12) United States Patent
Chen et al.

(10) Patent No.: US 12,543,126 B2
(45) Date of Patent: Feb. 3, 2026

(54) POWER HEADROOM REPORTING METHOD FOR USER EQUIPMENT, MEDIUM, AND USER EQUIPMENT

(71) Applicant: HUAWEI TECHNOLOGIES CO., LTD., Guangdong (CN)

(72) Inventors: Yan Chen, Shanghai (CN); Bingguang Peng, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 483 days.

(21) Appl. No.: 18/249,060

(22) PCT Filed: Oct. 9, 2021

(86) PCT No.: PCT/CN2021/122808
§ 371 (c)(1),
(2) Date: Apr. 14, 2023

(87) PCT Pub. No.: WO2022/083456
PCT Pub. Date: Apr. 28, 2022

(65) Prior Publication Data
US 2023/0397126 A1    Dec. 7, 2023

(30) Foreign Application Priority Data
Oct. 22, 2020   (CN) .......................... 202011141931.5

(51) Int. Cl.
*H04W 52/36* (2009.01)
*H04W 52/14* (2009.01)

(52) U.S. Cl.
CPC ....... *H04W 52/365* (2013.01); *H04W 52/146* (2013.01)

(58) Field of Classification Search
CPC . H04W 52/365; H04W 52/146; H04W 24/10; H04W 52/04; H04W 52/36; H04W 52/367; H04W 72/04; H04W 72/0473
See application file for complete search history.

(56) References Cited

U.S. PATENT DOCUMENTS

2011/0292874 A1* 12/2011 Ho ..................... H04W 52/42
                                                        370/328
2014/0349701 A1* 11/2014 Vajapeyam ........... H04W 52/34
                                                        455/522

(Continued)

FOREIGN PATENT DOCUMENTS

CN            110536397 A      12/2019

*Primary Examiner* — Fayyaz Alam

(57) ABSTRACT

Embodiments of this application provide a power headroom reporting method for user equipment, a medium, and user equipment. The reporting method includes: The user equipment has at least a first uplink transmit antenna and a second uplink transmit antenna, the first uplink transmit antenna has a first P_MPR value, and the second uplink transmit antenna has a second P_MPR value; and when the user equipment performs uplink data transmission in a single-stream manner, the user equipment sends a first PHR value to a network side, where the first PHR value is obtained based on at least a third power management maximum power reduction P_MPR value, and the third power management maximum power reduction P_MPR value is between the first P_MPR value and the second P_MPR value. According to the power headroom reporting method in this application, an actual maximum transmit power that is obtained through calculation and that is of the user equipment is more accurate, and further, the user equipment can report the power headroom more accurately.

20 Claims, 4 Drawing Sheets

(56) References Cited

U.S. PATENT DOCUMENTS

| | | | |
|---|---|---|---|
| 2020/0288412 A1* | 9/2020 | Ajdakple | H04W 52/365 |
| 2021/0377876 A1* | 12/2021 | Jeon | H04W 52/365 |
| 2022/0110071 A1* | 4/2022 | Hosseini | H04W 80/02 |

* cited by examiner

POWER HEADROOM REPORTING METHOD FOR USER EQUIPMENT, MEDIUM, AND USER EQUIPMENT

CROSS-REFERENCE TO RELATED APPLICATIONS

This disclosure is a national stage of International Application No. PCT/CN2021/122808, filed on Oct. 9, 2021, which claims priority to Chinese Patent Application No. 202011141931.5. filed on Oct. 22, 2020. Both of the aforementioned applications are hereby incorporated by reference in their entireties.

TECHNICAL FIELD

This application relates to the field of mobile communication technologies, and in particular, to a power headroom reporting method for user equipment, a medium, and user equipment.

BACKGROUND

In the field of mobile communication, more user equipments (User Equipment, UE) perform uplink data transmission by using a dual-antenna technology or even a multi-antenna technology. For example, user equipment 100 includes an antenna 101 and an antenna 102. The user equipment 100 may separately perform uplink data transmission on different data by using the antenna 101 and the antenna 102, to improve uplink data transmission efficiency. Alternatively, the user equipment 100 may perform uplink data transmission on same data by using the antenna 101 and the antenna 102, to enhance uplink data transmission. The foregoing two cases may be referred to as dual-stream and single-stream respectively.

In a process in which the user equipment 100 performs uplink data transmission, a power headroom (Power Headroom, PH) is a reference basis for a base station (for example, an eNB or an NR) to allocate, to the user equipment 100, resources used for uplink data transmission. The power headroom indicates a transmit power that can be used by the user equipment 100 in addition to a currently used transmit power. The power headroom may be understood as a difference obtained by subtracting a current actual maximum transmit power from a maximum transmit power supported by the user equipment 100. Usually, the base station may perform power control based on the power headroom reported by the user equipment 100. For example, if a value of the power headroom is positive, the base station may continue to increase resources allocated to the user equipment; or if a value of the power headroom is negative, it indicates that the current transmit power already exceeds the maximum transmit power supported by the user equipment 100, and it may be considered to reduce the resources allocated to the user equipment 100.

SUMMARY

The following describes this application from a plurality of aspects. For implementations and beneficial effects in the following plurality of aspects, refer to each other.

Usually, user equipment uses a maximum P_MPR value of each uplink transmit antenna of the user equipment as overall P_MPR of the user equipment. The user equipment does not perform calculation on P_MPR corresponding to each uplink transmit antenna and a maximum power of the antenna to obtain an actual maximum transmit power of the user equipment. Consequently, a power headroom obtained through calculation is inaccurate.

To cope with the foregoing scenario, a first aspect of this application provides a power headroom reporting method for user equipment, where the method includes: The user equipment has at least a first uplink transmit antenna and a second uplink transmit antenna, the first uplink transmit antenna has a first P_MPR value, and the second uplink transmit antenna has a second P_MPR value; and when the user equipment performs uplink data transmission in a single-stream manner, the user equipment sends a first PHR value to a network side, where the first PHR value is obtained based on at least a third power management maximum power reduction P_MPR value, and the third power management maximum power reduction P_MPR value is between the first P_MPR value and the second P_MPR value.

The first uplink transmit antenna and the second uplink transmit antenna herein may be an antenna 101 and an antenna 102 of user equipment 100. The network side may be a network device 200.

In a possible implementation of the first aspect, when the user equipment performs uplink data transmission in a dual-stream manner, the user equipment sends a second PHR value to the network side, where the second PHR value is obtained based on at least a fourth power management maximum power reduction P_MPR value, and the fourth power management maximum power reduction P_MPR value is a maximum value in the first P_MPR value and the second P_MPR value.

In a possible implementation of the first aspect, the first P_MPR value and the second P_MPR value are determined based on a maximum power reduction (MPR) and an SAR maximum transmit power reduction of each of the first uplink transmit antenna and the second uplink transmit antenna.

The first P_MPR value and the second P_MPR value herein may be a maximum value in $MPR_{101}$ and $P\_MPR_{101}$ of the antenna 101 and a maximum value in $MPR_{102}$ and $P\_MPR_{102}$ of the antenna 102 of the user equipment 100, respectively.

In a possible implementation of the first aspect, the first PHR value is an actual maximum transmit power of the user equipment, and the third power management maximum power reduction P_MPR value is an overall power reduction value of the user equipment.

In a possible implementation of the first aspect, the first PHR value is equal to a difference between an overall power class and the third power management maximum power reduction P_MPR value.

In a possible implementation of the first aspect, the third power management maximum power reduction P_MPR value is equal to a difference between the overall power class of the user equipment and a sum of actual power reductions of both of the first uplink transmit antenna and the second uplink transmit antenna.

In a possible implementation of the first aspect, a difference between a maximum transmit power of each uplink transmit antenna and an actual maximum transmit power of each uplink transmit antenna is determined as an actual power reduction of each uplink transmit antenna.

In a possible implementation of the first aspect, the actual maximum transmit power of each uplink transmit antenna is determined based on a difference between the maximum transmit power of each uplink transmit antenna and a maximum value in the maximum power reduction (MPR) and the SAR maximum transmit power reduction.

In a possible implementation of the first aspect, a weighted actual power reduction of each uplink transmit antenna is determined based on an actual power reduction of each uplink transmit antenna and a weight of each uplink transmit antenna.

In a possible implementation of the first aspect, the third power management maximum power reduction P_MPR value is determined based on a difference between the overall power class of the user equipment and the weighted actual power reduction of each uplink transmit antenna.

In a possible implementation of the first aspect, the weight of each uplink transmit antenna is a signal matrix of each uplink transmit antenna.

In a possible implementation of the first aspect, the third power management maximum power reduction P_MPR value is determined in a linear weighting manner based on a maximum value in the maximum power reduction (MPR) and the SAR maximum transmit power reduction of each uplink transmit antenna.

In a possible implementation of the first aspect, a range of the third power management maximum power reduction P_MPR value is less than maximum values of maximum power reductions (MPR) and SAR maximum transmit power reductions of all uplink transmit antennas of the user equipment.

In a possible implementation of the first aspect, the fourth power management maximum power reduction P_MPR value is an overall power reduction value of the user equipment, and the second PHR value is equal to a difference between an overall power class of the user equipment and the fourth power management maximum power reduction P_MPR value.

A second aspect of this application provides a machine-readable medium, where the medium stores instructions, and when the instructions are run on a machine, the machine is enabled to perform the method provided in the first aspect.

A third aspect of this application provides user equipment, including: a processor; and a memory, where the memory stores instructions, and when the instructions are run on the processor, the user equipment is enabled to perform the method provided in the first aspect.

An objective of this application is to provide a power headroom reporting method, a medium, and user equipment. The user equipment can obtain, through calculation, an actual maximum transmit power of the user equipment based on a maximum transmit power and P_MPR corresponding to each uplink transmit antenna of the user equipment. In this way, the actual maximum transmit power that is obtained through calculation and that is of the user equipment is more accurate, and further, the user equipment can report the power headroom more accurately.

DESCRIPTION OF EMBODIMENTS

Figure 1:
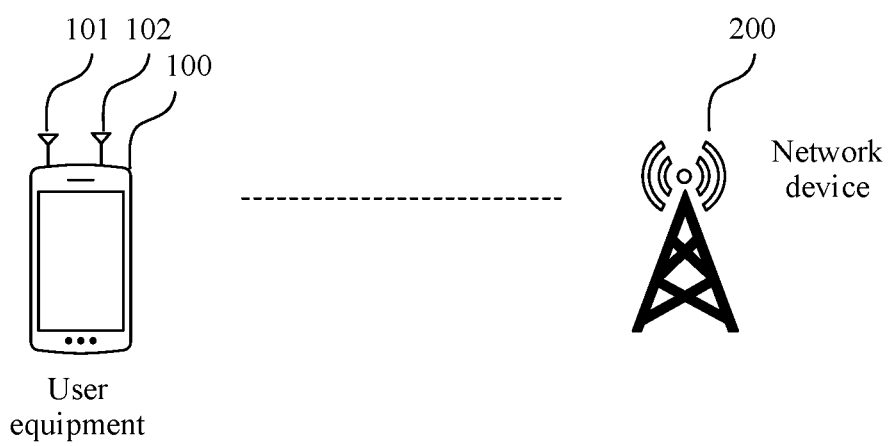
FIG. 1 is a diagram of a scenario of power headroom reporting according to an embodiment of this application.

The following further describes embodiments of this application in detail with reference to the accompanying drawings.

Embodiments of this application relate to a multi-input multi-output (multi-input multi-output, MIMO) technology. In this technology, a plurality of transmit antennas (transmitter, Tx) and a plurality of receive antennas (receiver, Rx) are used to transmit and receive signals at a transmit end and a receive end respectively. According to a capability of user equipment, the user equipment may support the following quantity configurations of Tx antennas and Rx antennas, for example, 1T2R, 2T4R, 1T4R, or 3T4R. The user equipment includes a plurality of Tx antennas or a plurality of Rx antennas. Correspondingly, the user equipment may support multi-stream data concurrency.

In a current communication protocol, the user equipment reports, to a network device, a quantity of receive antennas and a quantity of transmit antennas that are supported by the user equipment. When the network device schedules the user equipment to perform data transmission, the network device schedules a quantity of receive antennas and a quantity of transmit antennas that are not greater than the quantity of receive antennas and the quantity of transmit antennas that are reported by the user equipment to perform receiving and sending. User equipment with 2T4R is used as an example. The user equipment reports a sending capability of 2T and a receiving capability of 4R to the network device, and the network device may schedule the user equipment to send data with 1T or 2T, and schedule the user equipment to receive data with 1R, 2R, 3R, or 4R. That is, the network device may schedule a rank 1 (rank 1) (that is, a single-stream mode) or a rank 2 (rank 2) (that is, a dual-stream mode) to send data, or schedule a rank 1 (rank 1) (that is, a single-stream mode), a rank 2 (rank2) (that is, a dual-stream mode), a rank 3 (rank 3) (that is, a three-stream mode), or a rank 4 (rank 4) (that is, a four-stream mode) to receive data.

An uplink multi-antenna technology of an NR system becomes a standard configuration. According to the foregoing analysis, when a channel condition is favorable, a multi-stream mode can be used to improve transmission efficiency. When a channel condition is poor, array gain, diversity gain, and power gain of a plurality of antennas can be used. An SCDD technology widely used in the NR system uses array gain, diversity gain, and power gain. In the SCDD technology, two or more antennas transmit "same" signals with different phases.

This application provides a power headroom reporting solution. FIG. 1 is a diagram of a scenario of power headroom reporting according to some embodiments of this application. Specifically, as shown in FIG. 1, in this scenario, there is a communication system 10 including user equipment 100 (only one is shown) and a network device 200 (only one is shown). The user equipment 100 includes a plurality of antennas. For ease of description, in FIG. 1, two antennas (uplink transmit antennas) are used as an example: an antenna 101 and an antenna 102. When the user equipment 100 supports a small cyclic delay diversity (Small Cyclic Delay Diversity, SCDD) technology, the antenna 101 and the antenna 102 form a group, and may send uplink data to the network device 200 in a dual-stream or single-stream manner.

It may be understood that the user equipment 100 herein is a terminal device that provides voice and/or data connectivity for a user. For example, common terminal devices include: a vehicle-mounted device, a mobile phone, a tablet computer, a notebook computer, a palmtop computer, a mobile Internet device (mobile Internet device, MID), a wearable device (for example, a smart watch, a smart band, a pedometer, and the like), a personal digital assistant, a portable media player, a navigation device, a video game device, a set-top box, a virtual reality and/or augmented reality device, an Internet of Things device, an industrial control device, a streaming media client device, an e-book, a reading device, a POS terminal, and another device.

The network device 200, also referred to as a radio access network (Radio Access Network, RAN) device, is a device that connects the user equipment to a wireless network. The network device includes network devices in various communication standards, for example, including but not limited to a base station (NR), an evolved NodeB (evolved NodeB, eNB), a radio network controller (radio network controller, RNC), a NodeB (NodeB, NB), a network device controller (Base Station Controller, BSC), a network device transceiver (Base Transceiver Station, BTS), a home network device (for example, a Home evolved NodeB, or a Home NodeB, HNB), or a baseband unit (BaseBand Unit, BBU). The network device includes network devices of various frequency standards, for example, includes but is not limited to a low-frequency network device and a high-frequency network device. Alternatively, the network device 200 may be access network devices (for example, 5G NR base stations) and core network devices of different standards.

In a process in which the user equipment 100 performs uplink data transmission, the power headroom may be a difference between an actual maximum transmit power allowed by the user equipment 100 and a current required power obtained through calculation. A calculation formula of the power headroom is as follows: $PH = P_{max} - P_{cal}$. Pmax is the actual maximum transmit power of the user equipment 100, which is a maximum transmit power after power reduction is considered according to a protocol procedure, and $P_{cal}$ is the required power obtained, through calculation, by the user equipment 100 at a reporting moment according to a corresponding scheduling protocol power control procedure, that is, a maximum transmit power currently supported by the user equipment 100. The difference between the two is the power headroom.

The actual maximum transmit power of the user equipment 100 is a sum of actual maximum transmit powers of the antennas included in the user equipment 100. A value of an actual maximum transmit power $P_{CMAX}$ of an antenna is between $P_{CMAX\_L, f, c}$ and $P_{CMAX\_H, f, c}$. The foregoing $P_{CMAX\_L, f,c}$ and $P_{CMAX\_H, f, c}$ may be separately calculated by using the following methods:

$$P_{CMAX\_L,f,c} = \text{MIN}\{P_{EMAX,c} - \Delta T_{C,c}(P_{PowerClass} - \Delta P_{PowerClass}) - \text{MAX}(\text{MAX}(MPR_c, A\text{-}MPR_c) + \Delta T_{IB,c} + \Delta T_{C,c} + \Delta T_{RxSRS}, P\text{-}MPR_c)\}; \text{ and}$$

$$P_{CMAX\_H,f,c} = \text{MIN}\{P_{EMAX,c}, P_{PowerClass} - \Delta P_{PowerClass}\}.$$

In the foregoing calculation formula of $P_{CMAX\_H, f, c}$, $P_{EMAX, c}$ and $P_{PowerClass} - \Delta P_{PowerClass}$ are not variables but upper limit values, and therefore $P_{CMAX}$ is mainly determined by the formula corresponding to $P_{CMAX\_L, f, c}$.

In the foregoing calculation formula of $P_{CMAX\_L, f, c}$, $\Delta T_{C, c}$ is a fixed value; A-MPR$_c$ is a value configured by the network device 200 for the user equipment 100 in RRC (Radio Resource Control, radio resource control) signaling; $\Delta T_{IB, c}$ is an additional power relaxation allowed by the user equipment 100 to support CA (Carrier Aggregation, carrier aggregation) or DC (Dual Connectivity, dual connectivity); $\Delta T_{RxSRS}$ is a power offset related to an SRS (Sounding Reference Signal, sounding reference signal) channel; MPR$_c$ is a power reduction related to a modulation mode; and P-MPR$_c$ is a power reduction related to SAR (Specific Absorption Rate, electromagnetic radiation absorption rate), that is, an SAR maximum transmit power reduction. It may be understood that $\Delta T_{C, c}$, A-MPR$_c$, and $\Delta T_{IB, c}$ may all be considered as fixed values, and $\Delta T_{RxSRS}$ is not an irrelevant value in this embodiment of this application. Therefore, there is only MPR$_c$ and P-MPR$_c$ are variables related to the maximum transmit power of the user equipment 100. When the foregoing fixed values and irrelevant values are excluded, the foregoing formula may be simplified as:

$$P_{CMAX\_c} = P_{PowerClass\_c} - \text{MAX}(MPR_c, P\text{-}MPR_c).$$

$P_{PowerClass\_c}$ is a maximum transmit power class of the user equipment on a carrier c. For example, existing $P_{PowerClass}$ mainly includes: a power class 2 (Power Class 2, PC2) corresponding to 26 dBm, and a power class 3 (Power Class 3, PC3) corresponding to 23 dBm. Therefore, for example, $P_{PowerClass\_c}$ is 26 dBm, the actual maximum transmit power of the user equipment 100 on the carrier c varies with MAX(MPR$_c$, P_MPR$_c$).

The MPR (maximum power reduction, maximum power reduction) and the electromagnetic radiation maximum power reduction P_MPR, that is, the SAR maximum transmit power reduction, are corresponding to the antenna of the user equipment. In order to make the electromagnetic radiation of the user equipment 100 meet requirements of related regulations, an electromagnetic power density exposure requirement (Electromagnetic Power Density Exposure Requirement) is met by reducing the transmit power of the transmit antenna, and the transmit power of each uplink transmit antenna of the user equipment 100 is reduced by a fixed value. This value is referred to as P_MPR. The MPR is mainly used to enable a radio frequency power amplifier of the user equipment to enter a linear working area, so that a radio frequency index of the user equipment can meet a requirement.

For a plurality of antennas of same user equipment, MPRs of the antennas are not greatly differen to and P_MPRs may be greatly different.

The following describes an existing method for calculating the actual maximum transmit power of the user equipment 100 with reference to Table 1 (It may be understood that all values in Table 1 are examples, and a person skilled in the art may use other values to perform same processing according to an actual situation).

TABLE 1

| Overall power class (user equipment 100) | Maximum transmit power Pmax | MPR | P-MPR | MAX(MPR, P-MPR) | Actual maximum transmit power of each antenna | Reported value of $P_{CMAX}$ in a case of not distinguishing single-stream and dual-stream in the conventional technology | Reported value of $P_{CMAX}$ in a case of single-stream in the present disclosure | Reported value of $P_{CMAX}$ in a case of single-stream in the present disclosure (Implementation 1) | Reported value of $P_{CMAX}$ in a case of dual-stream in the present invention |
|---|---|---|---|---|---|---|---|---|---|
| 26 | Antenna 101 | 23 | 1 | 2 | 2 | 21 | 22 | 22 to 24 | 23.12 | 22 |
|  | Antenna 102 | 23 | 1 | 4 | 4 | 19 | | | | |

As shown in Table 1 (If a value in Table 1 has a decimal place, in this embodiment of this application, for ease of description, two decimal places are reserved. However, for a value of the value, refer to Table 1.), the maximum transmit powers $P_{max101}$ and $P_{max102}$ of the antenna 101 and the antenna 102 of the user equipment 100 are both 23 dBm. Herein, dBm (Decibel Relative To One Milliwatt, decibel milliwatt) is an absolute value of a power. For example, P_MPR$_{101}$ and P_MPR$_{102}$ corresponding to the antenna 101 and the antenna 102 are 2 dB and 4 dB respectively. MPR$_{101}$ and MPR$_{102}$ are both 1 dB.

First, the user equipment 100 determines an antenna whose MAX(MPR, P_MPR) is a maximum value, and uses a value of MAX(MPR, P_MPR) of the antenna as a P_MPR value (P_MPR$_{max}$) of the entire user equipment 100.

As shown in Table 1, the user equipment 100 determines, based on values of MAX(MPR, P_MPR) of the antenna 101 and the antenna 102, P_MPR$_{max}$ of the entire user equipment, where P_MPR$_{max}$=MAX(P_MPR$_{101}$, P_MPR$_{102}$)=4 dB, and then obtains the actual maximum transmit power P$_{CMAX100}$ of the user equipment 100 by using the foregoing formula, where P$_{CMAX100}$=(23 dBm−MAX(1 dB, 4 dB))+(23 dBm−MAX(1 dB, 4 dB)). It may be understood that, in the conventional technology, a maximum value in P_MPR of the antenna 101 and P_MPR of the antenna 102 is used as the overall P_MPR of the user equipment 100 to calculate the actual maximum transmit power of the user equipment 100.

The actual maximum transmit power of the user equipment 100 herein is not obtained by directly performing addition or subtraction calculation on the maximum transmit powers of the antenna 101 and the antenna 102 and P_MPR$_{max}$. For the calculation of values in a unit of dBm, the values in the unit of dBm may be converted into values in a unit of mW (milliwatt), and then the values are added. Values in the unit of dBm and values in a unit of dB may be directly added or subtracted. Finally, values in the unit of mW are converted into values in the unit of dBm.

Then, the user equipment 100 calculates the actual maximum transmit power of each uplink transmit antenna.

The user equipment 100 subtracts P_MPR$_{max}$=4 dB from P$_{max101}$=23 dBm and P$_{max102}$=23 dBm respectively to obtain the actual maximum transmit powers of the antenna 101 and the antenna 102, that is, P$_{CMAX101}$ (dBm)=P$_{CMAX102}$ (dBm)=19 dBm.

Finally, the user equipment 100 adds up the actual maximum transmit power of each uplink transmit antenna, and calculates the actual maximum transmit power of the user equipment 100.

The user equipment 100 may obtain PC$_{MAX101}$ (mW)=PC$_{MAX102}$ (mW)=$10^{(20/10)}$ mW=79.43 mW by using P=(1 mW)$10^{(x/10)}$ (Formula 1) after 20 dBm is input into the Formula 1, where x is an input value in a unit of dBm, and P is an output value in a unit of mW. The user equipment 100 adds 79.43 mW and 79.43 mW to obtain 159.86 mW.

Finally, the user equipment 100 may obtain 10 log$_{10}$(200)=22 dBm by using x=10 log$_{10}$(P/1 mW) (Formula 2) after 200 mW is input into the Formula 2, where x is an input value in a unit of dBm, and P is an output value in a unit of mW. That is, the actual maximum transmit power P$_{CMAX100}$ (dBm) of the user equipment 100 obtained through calculation by using the foregoing method is 22 dBm.

It can be learned from the method for calculating the actual maximum transmit power of the user equipment 100 that, in the process of reporting the power headroom, the user equipment 100 does not distinguish between cases in which the single-stream manner or the dual-stream manner is used. The actual maximum transmit power of the user equipment 100 may be a sum of the actual maximum transmit powers of the antenna 101 and the antenna 102: P$_{CMAX100}$ (P$_{max101}$−MAX(MPR$_{101}$, P_MPR$_{max}$))+(P$_{max102}$−MAX(MPR$_{102}$, P_MPR$_{max}$)).

P_MPR$_{max}$ is a maximum value in P_MPR$_{101}$ and P_MPR$_{102}$ corresponding to the antenna 101 and the antenna 102, and P$_{max101}$ and P$_{max102}$ are maximum transmit powers of the antenna 101 and the antenna 102. It can be seen from the foregoing formula that, in an existing method for calculating the maximum transmit power of the user equipment 100, a maximum value of P_MPR of the antenna 101 and the antenna 102 of the user equipment 100 is used as the overall P_MPR of the user equipment 100. The actual maximum transmit power of the user equipment is not obtained by calculating P_MPR corresponding to each antenna and the maximum power of the antenna. Therefore, the power headroom obtained through calculation is inaccurate.

To resolve the problem that the power headroom reported by the user equipment 100 is inaccurate, in a process in which the user equipment 100 performs uplink data transmission, the user equipment 100 obtains maximum transmit powers P$_{max101}$ and P$_{max102}$ corresponding to the antenna 101 and the antenna 102 included in the user equipment 100, P_MPR$_{101}$ and P_MPR$_{102}$ corresponding to the antenna 101 and the antenna 102, and MPRs of the antenna 101 and the antenna 102. First, a sum of the maximum transmit powers of the antenna 101 and the antenna 102 is used as the maximum transmit power P$_{PowerClass100}$ of the user equipment 100. Then, for the antenna 101, the user equipment 100 first obtains, based on the MPR and P_MPR$_{101}$ corresponding to the antenna 101, a maximum value in the MPR and P_MPR$_{101}$ of the antenna 101, and records the maximum value as an actual P_MPR$_{101}$. Similarly, after calculating an actual P_MPR$_{102}$ of the antenna 102, the user equipment 100 adds the actual $P\_MPR_{101}$ and the actual $P\_MPR_{102}$ to obtain $P\_MPR_{100}$ of the user equipment 100. Finally, the user equipment 100 uses a difference between the maximum transmit power $P_{Powerclass100}$ and the actual $P\_MPR_{100}$ as the actual maximum transmit power of the user equipment 100 and a parameter of a power headroom, and reports the power headroom to the network device 200. According to the power headroom reporting method provided in this application, when the user equipment 100 includes a plurality of antennas, for example, the antenna 101 and the antenna 102, and the user equipment 100 performs uplink data transmission in a single-stream manner, the user equipment 100 can obtain, through calculation, the actual maximum transmit power of the user equipment 100 based on the maximum transmit powers corresponding to the antenna 101 and the antenna 102 and P_MPR, so that the obtained actual maximum transmit power of the user equipment 100 is more accurate.

Figure 2:
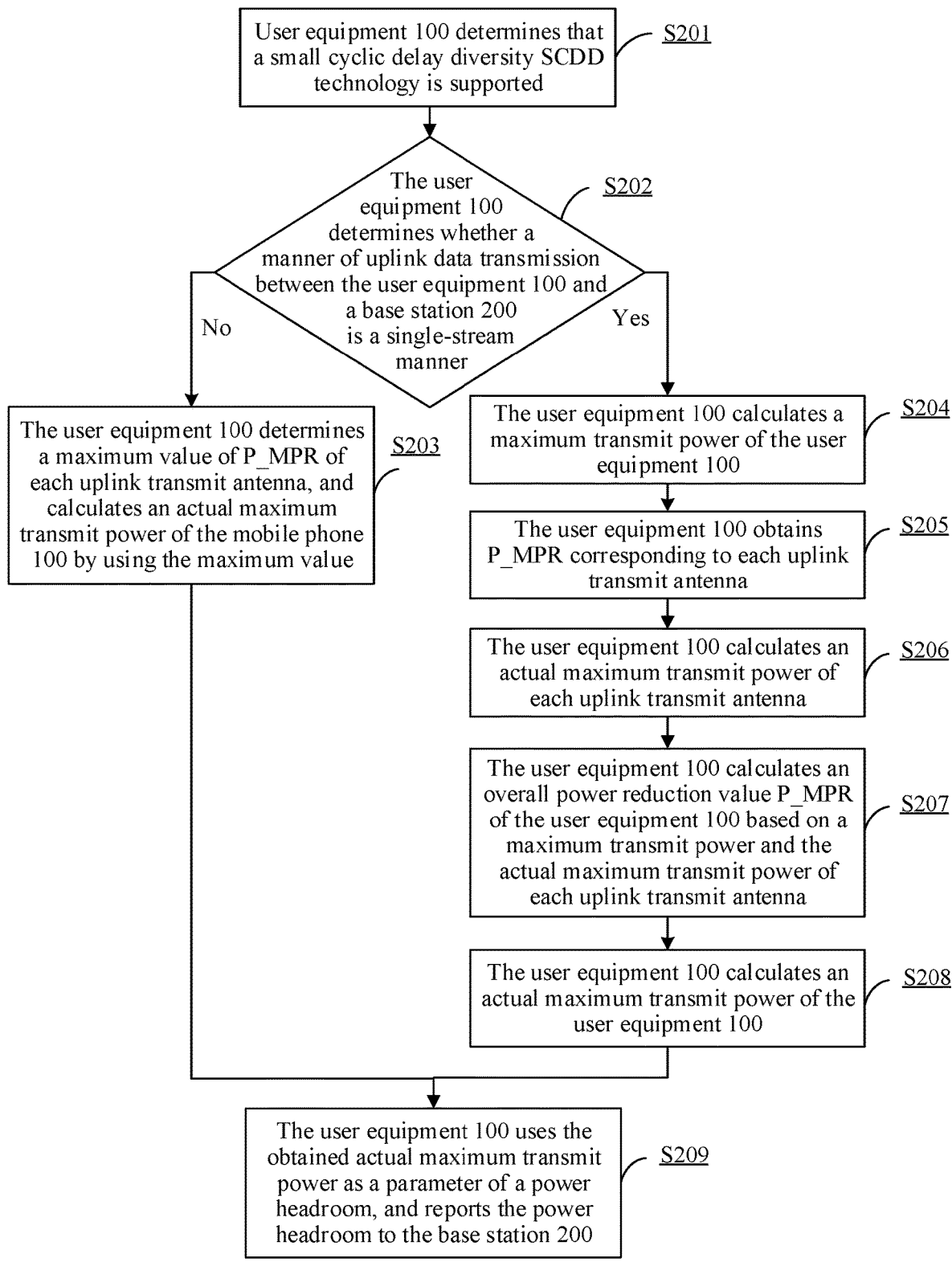
FIG. 2 is a flowchart of power headroom reporting according to an embodiment of this application.

Based on the scenario shown in FIG. 1 and with reference to FIG. 2, the following describes a technical solution in which the user equipment 100 reports the power headroom to the network device 200 in this application. Specifically, the user equipment 100 includes the antenna 101 and the antenna 102. Because MPRs of the antenna 101 and the antenna 102 are fixed values, for ease of calculation, in this embodiment of this application, the user equipment 100 sets the MPRs of the antenna 101 and the antenna 102 to 1 dB. As shown in FIG. 2, a process in which the user equipment 100 reports the power headroom to the network device 200 includes the following steps.

S201: The user equipment 100 determines that a small cyclic delay diversity SCDD technology is supported.

When the user equipment 100 supports the 4G or 5G communication protocol, the user equipment 100 detects whether the user equipment 100 supports the small cyclic delay diversity SCDD technology. If the user equipment 100 does not support the small cyclic delay diversity SCDD technology, the user equipment 100 performs uplink data transmission by using the antenna 101 or the antenna 102 in a single-antenna transmission manner. In this case, an overall power reduction value P_MPR of the user equipment 100 is P_MPR of an antenna used by the user equipment 100 (for example, $P\_MPR_{101}$ of the antenna 101). Therefore, the actual maximum transmit power Pmax of the user equipment 100 is a difference between the maximum transmit power $P_{max101}$ of the antenna 101 and $P\_MPR_{101}$ of the antenna 101, and is represented as $P_{max}-P_{max101}-P\_{MPR101}$.

If the user equipment 100 supports the small cyclic delay diversity SCDD technology, because the calculation method in this embodiment of this application varies depending on that a manner of uplink data transmission is a single-stream manner or a dual-stream manner, the user equipment performs S202 to determine the manner of uplink data transmission between the user equipment and the network device 200.

It may be understood that, in addition to the foregoing small cyclic delay diversity SCDD technology, as long as the user equipment 100 supports a similar diversity technology, for example, space diversity, frequency grading, time grading, and polarization diversity, all fall within the protection scope of this application.

S202: The user equipment 100 determines whether a manner of uplink data transmission between the user equipment 100 and the network device 200 is a single-stream manner or a dual-stream manner.

It may be understood that, when the user equipment 100 is close to the network device 200 (for example, a base station), the user equipment 100 may usually schedule the dual-stream manner. As the user equipment 100 moves far away from the network device 200, the user equipment 100 gradually switches the dual-stream manner to the single-stream manner. During this period, there is a transition belt, and the network device 200 may occasionally schedule the single-stream manner or the dual-stream manner in the transition belt. The network device 200 usually uses a method such as filtering and a hysteresis threshold to determine whether a single-stream manner or a dual-stream manner is used. This embodiment of this application includes but is not limited to the foregoing method.

The network device 200 determines whether quality of a channel of uplink and downlink data between the network device 200 and the user equipment 100 meets a channel quality threshold. If the quality is greater than the channel quality threshold, the network device 200 schedules the user equipment 100 to send uplink data to the network device 200 in a dual-stream manner, and the user equipment 100 may separately report data to the network device 200 by using the antenna 101 and the antenna 102.

If the quality is not greater than the channel quality threshold, S204 is performed. The network device 200 schedules the user equipment 100 to send uplink data to the network device 200 in a single-stream manner. The user equipment 100 may report data to the network device 200 by using the antenna 101 and the antenna 102 as a whole. Then, the actual maximum transmit power of the user equipment 100 is calculated by performing S204.

Whether the network device 200 schedules the manner of uplink data transmission between the network device 200 and the user equipment 100 to be the single-stream manner or the dual-stream manner may be implemented in the following manner.

When the user equipment 100 sends the uplink data to the network device 200, the network device 200 may determine, by using a CQI report sent by the user equipment 100 to the user equipment 200 or an uplink SRS signal sent by the user equipment 100, channel quality of the uplink and downlink data between the network device 200 and the user equipment 100. A CQI report is used as an example for description herein. A CQI report is a channel quality indicator (Channel Quality Indication, CQI) report, is mainly used to measure channel quality of uplink and downlink data between the network device 200 and the user equipment 100, and may be used to determine quality of a channel. For example, a value range of the CQI may be 0 to 31. When the CQI value is 0, the channel quality is the worst. When the CQI value is 31, the channel quality is the best. In this embodiment of the present disclosure, a value of the channel quality threshold may be 15. When the CQI between the network device 200 and the user equipment 100 is less than 15, the user equipment 100 determines that quality of a channel of uplink and downlink data between the network device 200 and the user equipment 100 is poor. When the CQI between the network device 200 and the user equipment 100 is greater than or equal to 15, the user equipment 100 determines that quality of a channel of uplink and downlink data between the network device 200 and the user equipment 100 is good.

It may be understood that the user equipment 100 may alternatively send an SRS signal to the network device 200. An SRS signal is an important signal in wireless communication transmission, is uplink reference information sent by the user equipment 100 to the network device 200, and reflects quality of a channel.

After scheduling, the network device 200 performs step S203. The user equipment 100 calculates the actual maximum transmit power of the user equipment 100 in a calculation manner corresponding to the dual-stream manner.

S203: The user equipment 100 determines an antenna (an uplink transmit antenna) whose P_MPR is a maximum value, uses the P-MPR value of the antenna as an overall P-MPR value of the user equipment 100, and calculates the actual maximum transmit power of the user equipment 100 by using the P-MPR value.

Herein, a process in which the user equipment 100 calculates the actual maximum transmit power of the user equipment 100 in S203 is the same as a process in which the user equipment 100 calculates the actual maximum transmit power based on the data in Table 1, and details are not described herein again.

If network scheduling is a single-stream manner, step S204 to step S207 are performed. The user equipment 100 calculates the actual maximum transmit power of the user equipment 100 by using P_MPR of each uplink transmit antenna.

As shown in Table 1, values of the maximum transmit powers $P_{max101}$ and $P_{max102}$ of the antenna 101 and the antenna 102, and corresponding $MPR_{101}$ and $MPR_{102}$, and $P\_MPR_{101}$ and $P\_MPR_{102}$ are the same as those in Table 1.

S204: The user equipment 100 calculates the maximum transmit power of the user equipment 100.

The user equipment 100 may obtain, according to Formula 1, values that are in the unit of mW and that are corresponding to the maximum transmit power of the antenna 101 and the maximum transmit power of the antenna 102, that is, $P_{max101}$ (mW)=$P_{max102}$ (mW)=199.52 mW. A sum of the maximum transmit powers of the antenna 101 and the antenna 102 is the maximum transmit power $P_{Powerclass100}$ (mW) of the user equipment 100, which is 399.05 mW. The maximum transmit power $P_{PowerClass100}$ (dBm) of the user equipment 100 may be obtained by using Formula 2, which is 26 dBm. That is, the overall power class of the user equipment 100 is PC2 (Power Class 2).

S205: The user equipment 100 obtains P_MPR corresponding to each uplink transmit antenna.

The user equipment 100 compares $MPR_{101}$ and $P\_MPR_{101}$ of the antenna 101, and compares $MPR_{102}$ and $P\_MPR_{102}$ of the antenna 102, to obtain two maximum values. A maximum value in $MPR_{101}$ and $P\_MPR_{101}$ corresponding to the antenna 101 is 2 dB, and a maximum value in $MPR_{102}$ and $P\_MPR_{102}$ corresponding to the antenna 102 is 4 dB.

S206: The user equipment 100 calculates the actual maximum transmit power of each uplink transmit antenna.

The user equipment 100 subtracts the maximum value 2 dB between $MPR_{101}$ and $P\_MPR_{101}$ and the maximum value 4 dB between $MPR_{102}$ and $P\_MPR_{102}$ from the maximum transmit power $P_{max101}$ (dBm) of the antenna 101 and the maximum transmit power $Pmax_{102}$ (dBm) of the antenna 102 respectively, to obtain the actual maximum transmit power (dB) $P_{CMAX101}$ of the antenna 101, which is 21 dBm, and the actual maximum transmit power $P_{CMAX102}$ (dB) of the antenna 102, which is 19 dBm. Then, the actual maximum transmit power of the antenna 101 and the actual maximum transmit power of the antenna 102 are converted into corresponding values in the unit of mW according to Formula 1. $P_{CMAX101}$ (dB)=21 dBm and $P_{CMAX102}$ (dB)=19 dBm correspond to $P_{CMAX101}$ (mW)=125.89 mW and $P_{CMAX102}$ (mW)=79.43 mW, respectively.

S207: The user equipment 100 calculates the overall power reduction value $P\_MPR_{100}$ of the user equipment 100 based on the maximum transmit power and the actual maximum transmit power of each uplink transmit antenna.

The user equipment 100 subtracts the actual maximum transmit powers $P_{CMAX1}02$ (mW), which is 125.89 mW, and $P_{CMAX1}02$ (mW), which is 79.43 mW, corresponding to the antenna 101 and the antenna 102 from the maximum transmit powers $P_{max101}$ (mW) and $P_{max102}$(mW), which are both 199.52 mW, of the antenna 101 and the antenna 102 respectively, to obtain an actual $P\_MPR_{101}$ (mW), which is 73.63 mW, and an actual $P\_MPR_{102}$ (mW), which is 120.09 mW, corresponding to the antenna 101 and the antenna 102. Then, the actual $P\_MPR_{102}$ and the actual $P\_MPR_{101}$ are summed up to obtain the $P\_MPR_{100}$ (mW) of the user equipment 100, which is 193.72 mW. Finally, the user equipment 100 calculates that the overall power reduction value $P\_MPR_{100}$ (dB) of the user equipment 100 is 2.88 dB by using Formula 3:

$$P_{PowerClass100}(dBm) - 10\log_{10}(P_{Powerclass100}(mW)/1mW) - 10\log_{10}(P\_MPR_{100}(mW)/1mW).$$

S208: The user equipment 100 calculates the actual maximum transmit power of the user equipment 100.

The actual maximum transmit power $P_{CMAX100}$ (dBm) of the user equipment 100, which is 23.12 dBm, may be obtained by subtracting the overall power reduction value $P\_MPR_{100}$ (dB) of the user equipment 100 from the maximum transmit power $P_{PowerClass100}$ (dBm) of the user equipment 100.

After the user equipment 100 calculates the actual maximum transmit power in the case of single-stream or dual-stream, the user equipment 100 performs S209 to report the power headroom.

S209: The user equipment 100 uses the obtained actual maximum transmit power as a parameter of a power headroom, and reports the power headroom to the network device 200.

It can be learned that, in the case of single-stream, the actual maximum transmit power $P_{CMAX100}$ (dBm) of the user equipment 100 is equal to 23.12 dBm. In this case, if the required power ($P_{CAL}$) of the user equipment 100 is 22 dBm, the power headroom reported by the user equipment 100 to the network device 200 may be a difference between 23.12 dBm and 22 dBm. After calculation, the difference may be 1.12 dBm. After the network device 200 obtains the power headroom, which is 1.12 dBm, reported by the user equipment 100, the network device 200 determines that the power headroom of the user equipment 100 is a positive number. In this case, the network device 200 may increase resource allocated for uplink data transmission of the user equipment 100.

If the user equipment 100 uses the calculation manner of the actual maximum transmit power of the user equipment 100 in the dual-stream case described in S203, the user equipment 100 calculates that the actual maximum transmit power of the user equipment 100 is 22 dBm. When the required power ($P_{CAL}$) of the user equipment 100 is 22 dBm, after the user equipment 100 reports the headroom power to the base station, the power headroom that is reported by the user equipment 100 and that is obtained by the network device 200 is 0. In this case, the network device 200 does not perform resource adjustment for uplink data transmission of the user equipment 100.

Although the foregoing steps S204 to S208 describe steps of calculating the actual maximum transmit power of the user equipment 100 in a sequential manner, a person skilled in the art can understand that, it is for the purpose of ease of description, and the steps of calculating and determining may be performed simultaneously or in another sequence.

When the manner of sending the uplink data between the network device 200 and the user equipment 100 is a single-stream manner, in addition to the method for calculating the actual maximum transmit power of the user equipment 100 described in S204 to S208, another implementation of the present disclosure further provides a method for the user equipment 100 to calculate the actual maximum transmit power of the user equipment 100. For a specific implementation, refer to the following description.

Implementation 2

In this implementation, the user equipment 100 uses the same steps as S204 to S208 and the data in Table 2 to calculate that the maximum transmit power $P_{PowerClass100}$ (mW) of the user equipment 100 is 399.05 mW, that is, $P_{PowerClass100}$ (dBm)=26 dBm, a maximum value in $MPR_{101}$ and $P\_MPR_{101}$ corresponding to the antenna 101 and the antenna 102 is 1 dB, a maximum value in $MPR_{102}$ and $P\_MPR_{102}$ is 3 dB, the actual $P\_MPR_{101}$ (mW) corresponding to the antenna 101 is 41.03 mW, the actual $P\_MPR_{102}$ (mW) corresponding to the antenna 102 is 99.52 mW, and a sum $P_{CMAX100}$ (mW) of actual maximum transmit powers of the antenna 101 and the antenna 102 of the user equipment 100 is 258.48 mW.

Different from the foregoing S208, the user equipment 100 may further obtain values $H_{101}$ and $H_{102}$ of signal matrices corresponding to the antenna 101 and the antenna 102, where the values of the signal matrices herein are used to indicate channel attenuation amplitudes of the antenna 101 and the antenna 102. As shown in Example 1 in Table 2, $H_{101}$ and $H_{102}$ are both 0.5. The user equipment 100 calculates, in a weighted manner, that an overall H-weighted power reduction value $P\_MPR_{100}$ (mW) is 140.56 mW by using Formula 5: (actual $P\_MPR_{101}$ (mW)*$H_{101}$+actual $P\_MPR_{102}$ (mW)*$H_{102}$)/($H_{101}$+$H_{102}$)*2.

Finally, the user equipment 100 calculates that the overall H-weighted power reduction value $P\_MPR_{100}$ (dB) of the user equipment 100 is 1.89 dB. Then, the actual maximum transmit power of the user equipment 100 is calculated based on a difference between the maximum transmit power of the user equipment 100 and overall $P\_MPR_{100}$ of the user equipment 100. It can be learned here that a step of calculating the overall H-weighted power reduction value $P\_MPR_{100}$ (dB) is the same as a part of calculating the overall power reduction value $P\_MPR_{100}$ (dB) of the user equipment 100 in S204 to S208.

As shown in Example 2 in Table 2, when the values of the signal matrices $H_{101}$ and $H_{102}$ corresponding to the antenna 101 and the antenna 102 is 0.02 and 0.98 respectively, the overall H-weighted power reduction value $P\_MPR_{100}$ (dB) calculated in Implementation 2 is 2.95 dB. Calculation manners of Example 3 to Example 5 in Table 2 are the same as those of Example 1 and Example 2. It can be seen from this that, when values of the signal matrices of the antenna 101 and the antenna 102 of the user equipment 100 are different but other values are the same, obtained overall power reduction values $P\_MPR_{100}$ are also different, and the actual maximum transmit power of the user equipment 100 is also different.

Implementation 3

In this implementation, values corresponding to the antenna 101 and the antenna 102 obtained by the user equipment 100 are the same as those in Implementation 2. A difference between Implementation 2 and Implementation 3 lies in the manner of calculating the overall power reduction value $P\_MPR_{100}$. In this implementation, the overall power reduction value $P\_MPR_{100}$ of the user equipment 100 is calculated in a linear addition manner. For example, when the MAX(MPR, P-MPR) corresponding to the antenna 101 and the antenna 102 are 2 dB and 4 dB respectively, the user equipment 100 stores linear weights a and b, where a+b=1, and a and b may be any positive real numbers, for example, a=0.12 and b=0.88. The user equipment 100 calculates, by using a linear weighted calculation manner, that is, $P\_MPR_{100}$=a*$P\_MPR_{101}$+b*$P\_MPR_{102}$, the overall power reduction value $P\_MPR_{100}$ is 3.76 dB. When the maximum

TABLE 2

| | Overall power class (user equipment 100) | Maximum transmit power | Pmax (dB) | MPR (dB) | P-MPR(dB) | MAX(MPR, P-MPR) | Actual maximum transmit power of each antenna (dB) | Actual maximum transmit power of each antenna (mW) | Power reduction of each antenna (mW) | H | Overall H-weighted power reduction value (mW) | Overall H-weighted power reduction value (dB) |
|---|---|---|---|---|---|---|---|---|---|---|---|---|
| Example 1 | 26 | Antenna 101 | 23 | 1 | 1 | 1 | 22 | 158.4893 | 41.03691 | 0.5 | 140.5631 | 1.891485 |
| | | Antenna 102 | 23 | 1 | 3 | 3 | 20 | 100 | 99.52623 | 0.5 | | |
| Example 2 | 26 | Antenna 101 | 23 | 1 | 1 | 1 | 22 | 158.4893 | 41.03691 | 0.02 | 196.7129 | 2.959529 |
| | | Antenna 102 | 23 | 1 | 3 | 3 | 20 | 100 | 99.52623 | 0.98 | | |
| Example 3 | 26 | Antenna 101 | 23 | 1 | 1 | 1 | 22 | 158.4893 | 41.03691 | 0.98 | 84.4134 | 1.034941 |
| | | Antenna 102 | 23 | 1 | 3 | 3 | 20 | 100 | 99.52623 | 0.02 | | |
| Example 4 | 26 | Antenna 101 | 23 | 1 | 1 | 1 | 22 | 158.4893 | 41.03691 | 0.2 | 175.6567 | 2.527667 |
| | | Antenna 102 | 23 | 1 | 3 | 3 | 20 | 100 | 99.52623 | 0.8 | | |
| Example 5 | 26 | Antenna 101 | 23 | 1 | 1 | 1 | 22 | 158.4893 | 41.03691 | 0.8 | 105.4696 | 1.336698 |
| | | Antenna 102 | 23 | 1 | 3 | 3 | 20 | 100 | 99.52623 | 0.2 | | | transmit power of the user equipment 100 is 26.01 dB, the actual maximum transmit power of the user equipment 100 is 22.25 dB.

Implementation 4

In this implementation, values corresponding to the antenna 101 and the antenna 102 obtained by the user equipment 100 are the same as those in Implementation 2. A difference between those in Implementation 2 and Implementation 4 lies in the method of calculating the overall power reduction value P_MPR$_{100}$. The difference lies in that the user equipment 100 first determines a maximum value of MAX(MPR, P_MPR) of the antenna 101 and the antenna 102. For example, when MAX(MPR, P_MPR) of the antenna 101 and the antenna 102 are respectively 2 dB and 4 dB, the maximum value is 4 dB. The overall power reduction value P_MPR$_{100}$ of the user equipment 100 may be any value in a range of [0 dB, 4 dB]. For example, the overall power reduction value P_MPR$_{100}$ of the user equipment 100 may be 2.55 dB. When the maximum transmit power of the user equipment 100 is 26.01 dB, the actual maximum transmit power of the user equipment 100 is 23.46 dB.

In addition, although the user equipment 100 having two antennas is shown in FIG. 1, because a quantity of antennas, a radio frequency circuit design, and the like of the user equipment 100 are different, a person skilled in the art may understand that this embodiment of this application is applicable to another multi-antenna case. In another embodiment of this application, the user equipment 100 may alternatively include another quantity of antennas. For example, the user equipment 100 includes three or more antennas. When the user equipment 100 includes three antennas, the user equipment 100 may perform uplink data transmission in a three-stream manner.

In addition, although the difference between the MPRs of the two antennas is small, the overall MPR obtained by using the solution described in the present disclosure may also be used to report a PHR or the like.

Figure 3:
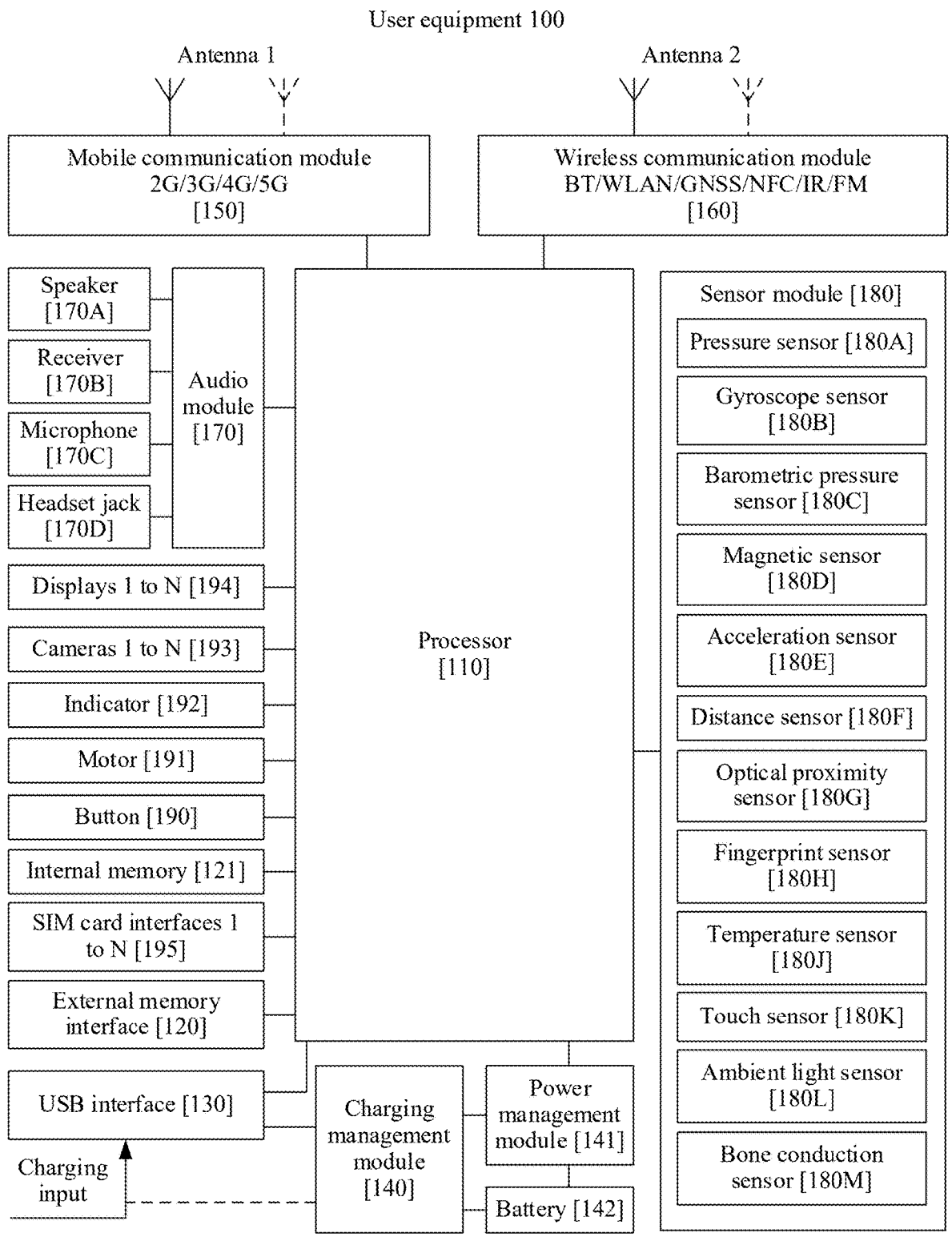
FIG. 3 is a schematic diagram of a structure of user equipment according to an embodiment of this application.

FIG. 3 is a schematic diagram of a structure of the user equipment 100.

As shown in FIG. 3, the user equipment 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present disclosure does not constitute a specific limitation on the user equipment 100. In some other embodiments of this application, the user equipment 100 may include more or fewer components than those shown in the figure, or some components may be combined, or some components may be split, or there may be a different component layout. The components shown in the figure may be implemented by using hardware, software, or a combination of software and hardware.

The processor 110 may include one or more processing units. A memory may be further disposed in the processor 110, and is configured to store instructions and data. In some embodiments, the memory in the processor 110 is a cache memory. The memory may store instructions or data just used or cyclically used by the processor 110. The processor 110 may perform the method described in FIG. 2, and is configured to report power headroom.

It may be understood that an interface connection relationship between the modules illustrated in embodiments of the present disclosure is merely an example for description, and does not constitute a limitation on a structure of the user equipment 100. In some other embodiments of this application, the user equipment 100 may alternatively use an interface connection manner different from that in the foregoing embodiment, or may use a combination of a plurality of interface connection manners.

A wireless communication function of the user equipment 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. The antenna 1 and the antenna 2 herein may be the antenna 101 and the antenna 102 of the user equipment 100. The user equipment 100 supports sending data by using the antenna 1 and the antenna 2 in the small cyclic delay diversity SCDD manner.

The mobile communication module 150 may provide a wireless communication solution that is applied to the electronic device 100 and that includes 2G/3G/4G/5G. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules in the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that is applied to the electronic device 100 and that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The external memory interface 120 may be used to connect to an external memory card, for example, a micro SD card, to extend a storage capability of the user equipment 100. The external memory card communicates with the processor 110 through the external memory interface 120, to implement a data storage function. For example, files such as music and videos are stored in the external memory card.

The internal memory 121 may be configured to store computer-executable program code. The executable program code includes instructions. The internal memory 121 may include a program storage area and a data storage area. The program storage area may store an operating system, an application required by at least one function (for example, a voice playing function or an image playing function), and the like. The data storage area may store use data (such as audio data or a phone book) created in a use process of the user equipment 100, or the like. In addition, the internal memory 121 may include a high-speed random access memory, or may include a nonvolatile memory, for example, at least one magnetic disk storage device, a flash memory, or a universal flash storage (universal flash storage, UFS). The processor 110 performs various function applications of the user equipment 100 and data processing by running the instructions stored in the internal memory 121 and/or instructions stored in the memory disposed in the processor. In this embodiment of the present disclosure, the internal memory 121 may be configured to store display styles corresponding to various APPs.

Figure 4:
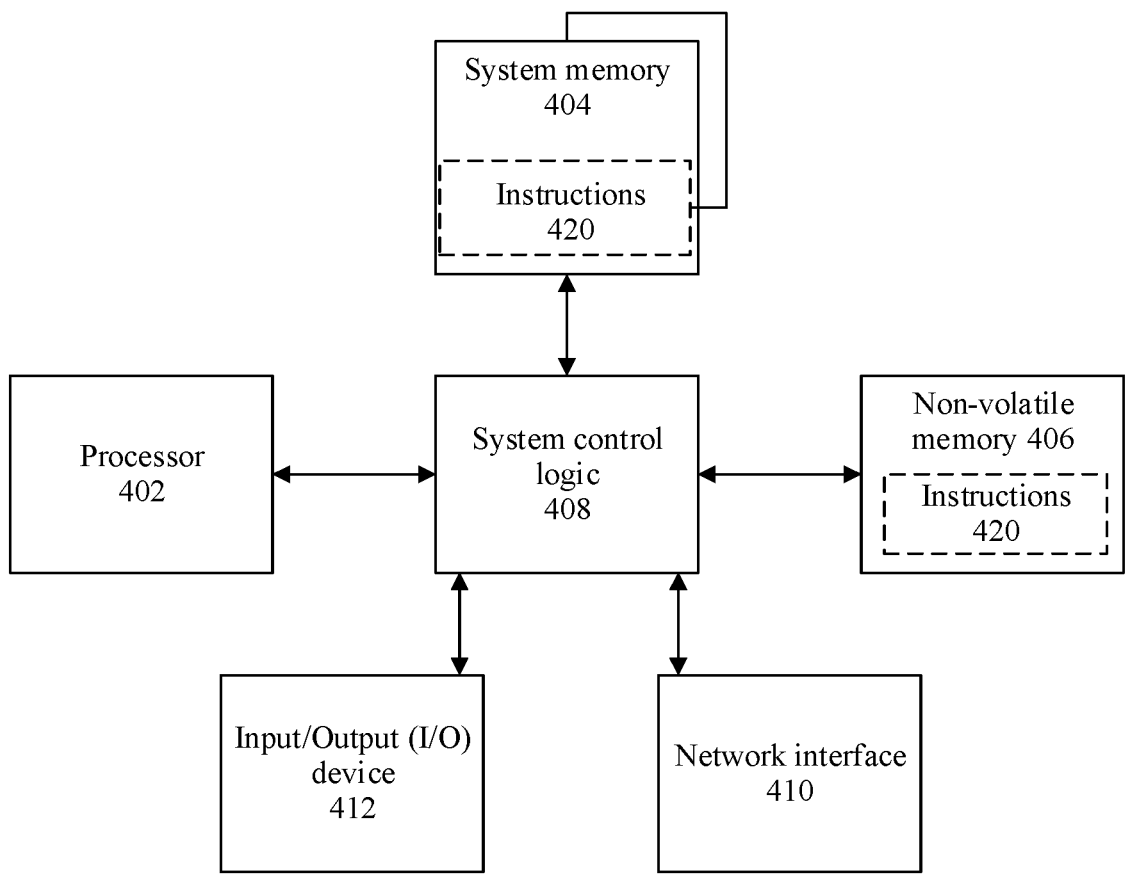
FIG. 4 is a block diagram of user equipment according to an embodiment of this application.

FIG. 4 is a block diagram of user equipment 400 according to an embodiment of this application. The user equipment 400 may include one or more processors 402, system control logic 408 connected to at least one of the processors 402, a system memory 404 connected to the system control logic 408, and a non-volatile memory (NVM) 406 connected to the system control logic 408, and a network interface 410 connected to the system control logic 408.

The processor 402 may include one or more single-core or multi-core processors. The processor 402 may include any combination of a general-purpose processor and a dedicated processor (for example, a graphics processing unit, an application processor, or a baseband processor). In this embodiment of this specification, the processor 402 may be configured to perform one or more of embodiments shown in FIG. 2.

In some embodiments, the system control logic 408 may include any proper interface controller, to provide any proper interface for the at least one of the processors 402 and/or any proper device or component that communicates with the system control logic 408.

In some embodiments, the system control logic 408 may include one or more memory controllers, to provide an interface connected to the system memory 404. The system memory 404 may be configured to load and store data and/or instructions. In some embodiments, the memory 404 in the user equipment 400 may include any proper volatile memory, for example, a proper dynamic random access memory (DRAM).

The NVM/memory 406 may include one or more tangible and non-transitory computer-readable media that are configured to store data and/or instructions. In some embodiments, the NVM/memory 406 may include any proper non-volatile memory such as a flash memory and/or any proper non-volatile storage device such as at least one of an HDD (Hard Disk Drive, hard disk drive), a CD (Compact Disc, compact disc) drive, and a DVD (Digital Versatile Disc, digital versatile disc) drive.

The NVM/memory 406 may include some storage resources on an apparatus installed on the user equipment 400, or may be accessed by a device, but is not necessarily a part of the device. For example, the NVM/memory 406 may be accessed over a network through the network interface 410.

In particular, the system memory 404 and the NVM/memory 406 each may include a temporary copy and a permanent copy of instructions 420. The instructions 420 may include an instruction that enables, when executed by at least one of the processors 402, the user equipment 400 to implement the method shown in FIG. 2. In some embodiments, the instructions 420, hardware, firmware, and/or software components thereof may additionally/alternatively be deployed in the system control logic 408, the network interface 410, and/or the processor 402.

In an embodiment, at least one of the processors 402 may be packaged together with logic of one or more controllers used for the system control logic 408, to form a system in package (SiP). In an embodiment, at least one of the processors 402 may be integrated on a same tube core with logic of one or more controllers used for the system control logic 408, to form a system on a chip (SoC).

The foregoing descriptions about the implementations allow a person skilled in the art to understand that, for the purpose of convenient and brief description, division into the foregoing function modules is taken as an example for illustration. During actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, division into the modules or the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, function units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art in the technical scope disclosed in this application shall fall within the protection scope of this application. Therefore, the protection scope of this application shall be subject to the protection scope of the claims.

What is claimed is:

1. A power headroom reporting method, comprising:
   determining, by a user equipment, a manner for uplink data transmission, the user equipment comprising a first uplink transmit antenna having a first power management maximum power reduction (P_MPR) value and a second uplink transmit antenna having a second P_MPR value;
   when determining that the user equipment performs an uplink data transmission in a single-stream manner, determining, by the user equipment, a first maximum value and a second maximum value, the first maximum value being a maximum value in a first maximum power reductions (MPR) of the first uplink transmit antenna and the first P_MPR, the second maximum value being a maximum value in a second MPR of the second uplink transmit antenna and the second P_MPR;
   determining, by the user equipment, a first power headroom report (PHR) value based on a third P_MPR value, the third P_MPR being less than a third maximum value that is a maximum value in the first maximum value and the second maximum value; and
   sending, by the user equipment, the first PHR to a network side.

2. The reporting method of claim 1, further comprising:
   when determining that the user equipment performs an uplink data transmission in a dual-stream manner, determining, by the user equipment, a second PHR value based on at least a fourth P_MPR value, the fourth P_MPR value being a maximum value in the first P_MPR value and the second P_MPR value; and
   sending, by the user equipment, a second PHR value to the network side.

3. The method of claim 1, wherein the third P_MPR value is an overall power reduction value of the user equipment, and the determining the first PHR value based on the third P_MPR comprises:
   determining an actual maximum transmit power of the user equipment based on an overall power class of the user equipment and the third P_MPR value; and
   determining the first PHR in accordance with the actual maximum transmit power of the user equipment and a required power of the user equipment.

4. The method of claim 1, wherein the third P_MPR is obtained by the following:
   calculating a first actual maximum transmit power of the first uplink transmit antenna and a second actual maximum transmit power of the second uplink transmit antenna based on the first maximum value and the second maximum value, respectively; and
   determining the third P_MPR value based on an overall power class of the user equipment and a sum of actual power reductions of the first uplink transmit antenna and the second uplink transmit antenna, each actual power reduction being dependent on a corresponding actual maximum transmit power of the first actual maximum transmit power and the second actual maximum transmit power.

5. The method of claim 4, wherein the first actual maximum transmit power is a difference between a first maximum transmit power of the first uplink transmit antenna and the first maximum value, the second actual maximum transmit power is a difference between a second maximum transmit power of the second uplink transmit antenna and the second maximum value.

6. The method of claim 1, wherein the third P_MPR is obtained by the following:

calculating a first actual maximum transmit power of the first uplink transmit antenna and a second actual maximum transmit power of the second uplink transmit antenna based on the first maximum value and the second maximum value, respectively; and determining the third P_MPR value based on an overall power class of the user equipment and a weighted actual power reduction, the weighted actual power reduction being determined based on a first actual power reduction of the first uplink transmit antenna, a second actual power reduction of the second uplink transmit antenna and weights, and each actual power reduction being dependent on a corresponding actual maximum transmit power of the first actual maximum transmit power and the second actual maximum transmit power.

7. The method of claim 5, wherein the third P_MPR value is determined based on a difference between a maximum transmit power of the user equipment and the weighted actual power reduction.

8. The method of claim 6, wherein each of the weights is a signal matrix of a corresponding uplink transmit antenna.

9. The method of claim 1, wherein the third P_MPR value is determined in a linear weighting manner based on the first P_MRP with a first weight and the second P_MRP with a second weight.

10. The method of claim 1, wherein the third P_MPR value is a value less than the third maximum value and larger than a fourth maximum value of the first maximum value and the second maximum value.

11. The method of claim 2, wherein the fourth P_MPR value is an overall power reduction value of the user equipment, and the second PHR value is equal to a difference between an overall power class of the user equipment and the fourth P_MPR value.

12. User equipment, comprising:
a processor; and
a memory, coupled to the processor and configured to store instructions that, when executed by the processor, cause the user equipment to perform the following steps:
determining a manner for uplink data transmission, the user equipment comprising a first uplink transmit antenna having a first power management maximum power reduction (P_MPR) value and a second uplink transmit antenna having a second P_MPR value;
when determining that the user equipment performs an uplink data transmission in a single-stream manner, determining, by the user equipment, a first maximum value and a second maximum value, the first maximum value being a maximum value in a first maximum power reductions (MPR) of the first uplink transmit antenna and the first P_MPR, the second maximum value being a maximum value in a second MPR of the second uplink transmit antenna and the second P_MPR;
determining a first power headroom report (PHR) value based on a third P_MPR value, the third P_MPR being less than a third maximum value that is a maximum value in the first maximum value and the second maximum value; and
sending the first PHR to a network side.

13. The user equipment of claim 12, wherein the instructions, when executed by the processor, further cause the user equipment to perform the following steps:
when determining that the user equipment performs an uplink data transmission in a dual-stream manner, determining a second PHR value based on at least a fourth P_MPR value, the fourth P_MPR value being a maximum value in the first P_MPR value and the second P_MPR value; and
sending a second PHR value to the network side.

14. The user equipment of claim 13, wherein the fourth P_MPR value is an overall power reduction value of the user equipment, and the second PHR value is equal to a difference between an overall power class of the user equipment and the fourth P_MPR value.

15. The user equipment of claim 12, wherein the third P_MPR value is determined in a linear weighting manner based on the first P_MRP with a first weight and the second P_MRP with a second weight.

16. The user equipment of claim 12, wherein the third P_MPR value is a value less than the third maximum value and larger than.

17. The user equipment of claim 12, wherein the third P_MPR value is an overall power reduction value of the user equipment, the determining the first PHR value based on the third P_MPR comprises:
determining an actual maximum transmit power of the user equipment based on an overall power class of the user equipment and the third P_MPR value; and
determining the first PHR in accordance with the actual maximum transmit power of the user equipment and a required power of the user equipment.

18. The user equipment of claim 12, wherein the third P_MPR is obtained by the following:
calculating a first actual maximum transmit power of the first uplink transmit antenna and a second actual maximum transmit power of the second uplink transmit antenna based on the first maximum value and the second maximum value, respectively; and
determining the third P_MPR value based on an overall power class of the user equipment and a sum of actual power reductions of the first uplink transmit antenna and the second uplink transmit antenna, each actual power reduction being dependent on a corresponding actual maximum transmit power of the first actual maximum transmit power and the second actual maximum transmit power.

19. The user equipment of claim 18, wherein the first actual maximum transmit power is a difference between a first maximum transmit power of the first uplink transmit antenna and the first maximum value, the second actual maximum transmit power is a difference between a second maximum transmit power of the second uplink transmit antenna and the second maximum value.

20. The user equipment of claim 12, wherein the third P_MPR is obtained by the following:
calculating a first actual maximum transmit power of the first uplink transmit antenna and a second actual maximum transmit power of the second uplink transmit antenna based on the first maximum value and the second maximum value, respectively; and
determining the third P_MPR value based on an overall power class of the user equipment and a weighted actual power reduction, the weighted actual power reduction being determined based on a first actual power reduction of the first uplink transmit antenna, a second actual power reduction of the second uplink transmit antenna and weights, and each actual power reduction being dependent on a corresponding actual maximum transmit power of the first actual maximum transmit power and the second actual maximum transmit power.

\* \* \* \* \*